United States Patent
Korst

(10) Patent No.: US 6,205,525 B1
(45) Date of Patent: Mar. 20, 2001

(54) SYSTEM FOR SUPPLYING DATA STEAMS

(75) Inventor: Johannes H. M. Korst, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/106,712

(22) Filed: Jun. 29, 1998

(30) Foreign Application Priority Data

Jul. 2, 1997 (EP) ................................................. 97202023

(51) Int. Cl.$^7$ ....................................................... G06F 13/00
(52) U.S. Cl. ................................ 711/154; 709/231; 710/6; 710/52
(58) Field of Search .................................... 711/112, 114, 711/171, 154, 100; 714/4; 709/231; 710/6, 52, 53, 18

(56) References Cited

U.S. PATENT DOCUMENTS

| | | | |
|---|---|---|---|
| 5,586,264 | * 12/1996 | Belknap et al. | 709/219 |
| 5,938,734 | * 8/1999 | Yao et al. | 709/232 |
| 5,950,015 | * 9/1999 | Korst et al. | 710/53 |
| 5,987,621 | * 11/1999 | Duso et al. | 714/4 |
| 6,061,732 | * 5/2000 | Korst et al. | 709/231 |

FOREIGN PATENT DOCUMENTS

| | | | |
|---|---|---|---|
| 0702491 | 3/1996 | (EP) | H04N/7/173 |
| 0737929 | 10/1996 | (EP) | G06F/17/30 |

\* cited by examiner

*Primary Examiner*—John W. Cabeca
*Assistant Examiner*—Denise Tran
(74) *Attorney, Agent, or Firm*—Daniel J. Piotrowski

(57) ABSTRACT

A system, like a video on demand server, retrieves blocks of data from a storage medium 100 and supplies the data to users in the form of at maximum $n^{max}$ data streams. Upon creation, a data stream is in a new state in which no sufficient data is present for consumption by a user, whereas a user may consume data for a data stream in an active state. A scheduler 170 repeatedly selects a group of data streams for which a data block of a predetermined size needs to be read and causes a reader 180 to read the data in one sweep and to store the read data in buffers 125. The group is formed by active data streams whose associated buffers 125 have room for storing the data block. The scheduler 170 variably determines the size of the data block for each next sweeping operation through an expression that, with respect to a number of data streams, is substantially based on an actual number $n^{act}$ of active data streams instead of $n^{max}$.

3 Claims, 3 Drawing Sheets

SYSTEM FOR SUPPLYING DATA STEAMS

BACKGROUND OF THE INVENTION

A system for retrieving blocks of data from a storage medium and supplying the data to users in the form of a plurality of at maximum $n_{max}$ data streams; wherein each data stream is in one of a plurality of states including at least a new and an active state, where a data stream upon creation is in the new state in which no sufficient data is present for consumption by a user and where for an active data stream a user may consume data; said system comprising:

for each data stream an associated buffer for storing data; and a reader for reading in one sweep from the storage medium for each data stream of a selected group of data streams a predetermined size data block and for storing the read data blocks in the buffers associated with the data streams;

a scheduler for repeatedly selecting the group of data streams for which a data block of a predetermined size needs to be read during a next sweeping operation of the reader; the group comprising active data streams whose associated buffers have room for storing the data block; and causing the reader to read data for the selected group.

A system of this kind is used in a multimedia server and, more specifically, in a video on demand or near video on demand server. A general requirement in such systems is to supply a continuous, un-interrupted stream of data to each active user. Typically, data is read from a conventional storage medium, such as hard disks, which are arranged in a disk array, such as a RAID system. In general, a distinction can be made between a fixed consumption rate and a variable consumption rate system. In a fixed consumption rate system data is, typically, supplied to a user as a fixed rate data stream. Usually, the rate is identical for each stream in the system. An example of such a system is a near-video-on-demand system, wherein a number of films can be played in parallel and the same film may be played several times in parallel, where regularly, for instance, every five or fifteen minutes, a new copy of the same film is started. In a variable consumption rate system the rate at which a user consumes data varies over time. Typically, a maximum consumption rate can be defined for each data stream. In practice, usually an identical maximum consumption rate is used for all streams, although it may. be possible to efficiently support streams with different maximum consumption rates (e.g. one maximum for an audio stream and another maximum for a combined video and audio stream). Variable consumption rate systems are, for instance, used for systems which support VCR-like functions such as pause or slow motion, or systems which use a data compression scheme with a variable bit rate, such as a variable bit rate MPEG-2 encoding.

To supply data to a user as a continuous data stream, special scheduling schemes for reading data from the disks are required with an appropriate scheme for temporarily buffering the read data before the data is supplied to the user. Typically, in successive intervals data blocks of a predetermined size are read for a group of data streams. To minimise disk access overhead, the data blocks for streams of the group are read in a sweeping movement of the head(s) of the disk(s) (e.g. from the outer edge to the inner edge of the disk or vice versa). The size of the block is determined such that in a worst case scenario, wherein a maximum number of streams allowed by the system all require data, no underflow of buffers can occur. As such, the block size corresponds to the number of data elements required to survive consumption at the maximum allowed bit-rate for the worst case duration of a sweeping movement wherein a data block is read for the maximum number of streams.

A conventional scheduling algorithm for a fixed consumption rate system is the so-called SCAN algorithm. In this algorithm at fixed regular intervals for each stream a fixed-size data block is read and stored in the buffer. Typically, for each stream a buffer with capacity for storing two blocks is used: one for reading data from the disk and one for supplying data to the user(s). Normally, the sweep and the buffer reading are synchronised: the buffers for all streams are read from the same buffer position and a new sweep is started at the moment when all read positions change from one block to the other (implying that in each buffer a block has become empty). The interval typically corresponds to a worst case duration of a sweeping movement wherein a data block is read for the maximum number of streams allowed by the system. Disk access is in the order in which the data for the streams happens to be located on the disk. No pre-conditions are made for storing the data on the disk, implying that a specific stream in one sweep may be serviced first and in a next sweep may be serviced last. As a consequence, a buffer of twice the block size is required.

Within a variable consumption rate system, different streams may empty a predetermined block of the buffer at different moments. Typically, during a reading operation data is only read for streams whose buffers have room for a predetermined size block of data. For those streams a block of data of the predetermined size is read. The other streams are skipped and may be serviced during the next interval. Due to the variable rate, different streams may empty one of the buffer blocks at different moments. To be prepared for the worst case for each stream a buffer of three blocks is required. As an example. a stream may have almost (but not entirely) emptied a block at the beginning of a sweep. This results in the stream being skipped for this sweep, since no entire block can be read. At the beginning of the next sweep, the stream may have almost emptied two blocks, resulting in one block being loaded in this sweep. To cope with the situation that the stream may be serviced last during this sweep, a total of three blocks are required. Such a scheduling algorithm is known as the Triple Buffering Algorithm. Due to streams not requiring a block being skipped, the duration of reading data in a sweeping movement is variable, bounded by a worst case sweep in a situation where the maximum number of streams all require a new data block.

New streams are only allowed to enter a not yet fully loaded system after a sweeping operation has been completed. Furthermore, an initial block of data needs to be read in a subsequent sweep. If no capacity is available in the subsequent sweep, the delay becomes even longer. As such the duration of a sweep determines the access time for new streams.

SUMMARY OF THE INVENTION

It is an object of the invention to provide a system of the kind set forth allowing for a reduced access time.

To achieve this object, the system according to the invention is characterised in that the scheduler is operative to variably determine the size of the data block for each next sweeping operation through an expression that, with respect to a number of data streams, is substantially based on an actual number $n^{act}$ of active data streams. The inventor has realised that although it is required to dimension the system for a worst case scenario, wherein for the maximum number of streams allowed by the system a data block is read of a size sufficient to survive consumption at the maximum allowed bit-rate for the worst case duration of a sweeping movement, the size of the block to be read in a less demanding situation can be smaller. Instead of basing the size on maximum allowed number of data streams, the size is based on the actual number $n_{act}$ of data streams which at that moment are active. In principle this technique can be applied for both fixed rate and variable rate systems. Particularly for video on demand systems, wherein significant changes in active number of data streams occur, the access time can be significantly reduced if the system is not fully loaded. For instance, if the system is loaded for 50% (i.e. the number of active streams is half the maximum allowed number), on average the duration of a sweep would be roughly half of the duration compared to a fully loaded system if still the same size block was read (for simplicity disk efficiency aspects are ignored here). As such also the access time would be halved. By basing the block size on the actual number of active streams. the block size may be reduced to, for instance, half of the block size read in a fully loaded system. This leads approximately to a further halving of the access time. Details are provided in the description of the figures, also taking disk efficiency aspects into consideration.

It should be noted that, particularly for variable bit rate systems, scheduling algorithms are known which read variable size blocks. According to such an algorithm, if a stream for a next sweeping operation requires less than a full-size block, the smaller size block is read and the stream is not skipped as usually is the case for fixed block scheduling algorithms. A drawback of such a scheduling algorithm is that, in practice, for almost every sweep a very small block needs to be read for almost every-active data stream. As a consequence, the disk overhead is significant, resulting in very inefficient sweeping operations. Particularly, if in a sweep new streams have been added (requiring reading of at least one full block for these streams in addition to reading many small blocks for the other active streams), the sweep duration may become significant, resulting in a long access time since the second component of the access time (duration of the sweep in which the first data for the stream is read) takes a long time.

The measure defined in the dependent claim 2 provides an effective way of ensuring that no buffer underflow can occur as a result of new streams entering the system and, as a result, causing a next sweeping operation to last longer. For each new cycle (sweeping operation) only up to a predetermined maximum number of $n^{delta}$ new streams may be added to the already active data streams. To ensure that the already active data streams can survive the new cycle without any underflow of the buffers occurring, as a precautionary measure in the previous cycle(s) a sufficient amount of data has been read for the active data streams to survive the worst case duration of the next cycle. The worst case situation occurs if in the next cycle data needs to be read for all already active data streams as well as for the maximum number of allowed new data streams. By already in previous cycle(s) reading a block of a size suitable for a system with $n^{act}+n^{delta}$ data streams possible underflow is avoided. It will be appreciated that in practice during the duration of a sweep only a relatively small number of requests for creating a new stream arrives at the system. Depending on the system, this may for a system capable of servicing hundreds or more streams be as low as or even below 1%. As a consequence, as long as the active number of data streams is well below the maximum allowed number of data streams, the access time is reduced significantly.

The measure defined in the dependent claim 3 provides an alternative way for ensuring that no buffer underflow can occur as a result of new streams entering the system. A further advantage of this embodiment lies in there being no limit on the number of new data streams allowed to enter in a next cycle. This makes the system attractive for applications with a rapidly changing number of active streams. For each new stream once, upon entering the system, a full block of data is fetched (a sufficient amount of data to survice a worst case sweep in a fully loaded system), whereas in all successive cycles an amount is read sufficient to survive a worst case next cycle (having the maximum duration for reading data for all active streams, being the already active streams plus the streams newly added in the current cycle).

These and other aspects of the invention will be apparent from and elucidated with reference to the embodiments shown in the drawings.

DESCRIPTION OF THE PREFERRED EMBODIMENTS

Figure 1:
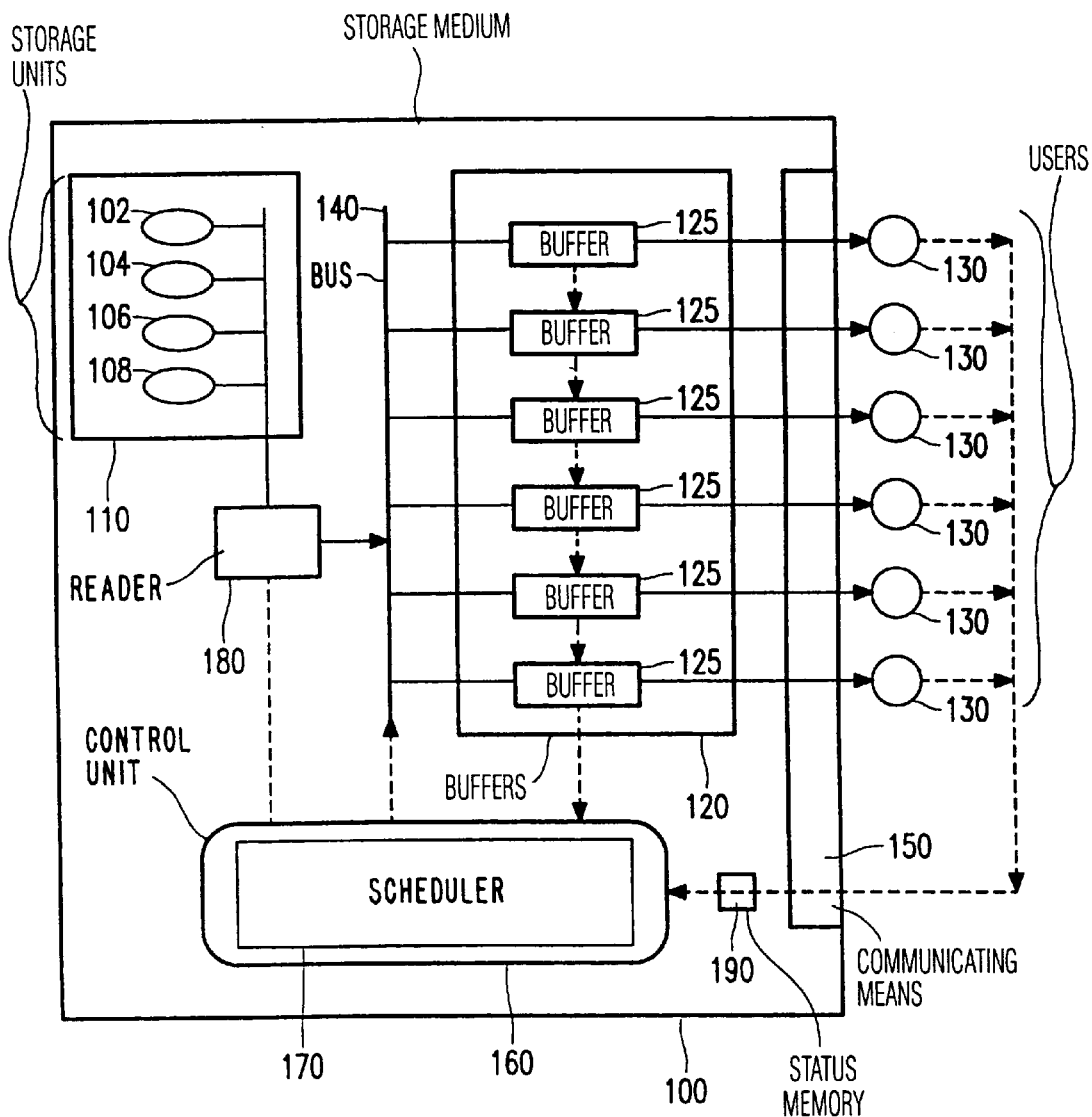
FIG. 1 shows a block diagram of the system according to the invention.

FIG. 1 shows a block diagram of a system 100 according to the invention. An example of such a system 100 is a multimedia server. Multimedia applications can be characterised by an extensive use of audio-visual material. For the playback of audio or video a (near-)continuous supply of audio/video data is required. Known examples of a multimedia server include a near-video-on-demand server and a video-on-demand server. In a near-video-on-demand system the service provider determines when a title is reproduced. A data stream containing the data of the title may be received by many users simultaneously. In a video-on-demand system, typically the user selects a title and controls, with VCR-like controls, the reproduction of the title. The level of interaction is higher and a data stream is typically only consumed by one user. A multimedia server is usually implemented using a file server which is specifically designed to supply continuous data streams of a similar data rate (typically bounded by an identical maximum data rate) for a large number of users in parallel. Usually, one or more multimedia titles are stored on a background storage medium 110. At this moment, normally disks, such as hard disks, are used as the background storage medium 110, based on their large storage capacity at low cost and the possibility of random access. It will be appreciated that also other storage media, such as optical disks, or even solid state memory may be used. The storage medium 110 may be divided into a plurality of storage units (shown are 102, 104, 106 and 108). As such, the storage medium 100 may be formed by a cluster of storage units, such as a RAID system. The storage unit, such as a hard disk, may itself be further sub-divided (resulting in a hierarchical cluster). For a typical video on demand system, which uses disk-based storage media, the number of storage units forming the storage medium 100 is usually determined by the required bandwidth. Typically, all data streams are bounded by a same maximum consumption rate of $c^{max}$ data elements per second, where a data element may for instance be a byte. For variable bit-rate encoded MPEG-2 material the maximum consumption rate will typically be chosen to be between approximately 2 or 15 Mbits/sec, depending on the desired quality. A system designed to support simultaneously up to $n^{max}$ data streams requires at least substantially $n^{max}*c^{max}/bw$ storage units, where bw is the bandwidth of an individual storage unit (to compsate for switching overhead more storage units may be required). In many systems, the data blocks are striped over all or a group of disks. A request for a data block results then in a disk access to all (or the group of) disks in the array. For the purpose of this description it is assumed that the storage medium 100 is formed by one storage unit with a suitably high bandwidth and/or storage capacity (whereas actually more than one storage unit may be used). It will be appreciated that in practice the maximum consumption rate for some data streams may be lower, for instance if the corresponding title is of a lower quality or a different type (e.g. audio, whereas most streams relate to a combination of audio and video) than a worse case situation for which the system usually is designed.

The system 100 comprises a reader 180 for reading data from the storage medium 110. The reader 180 may, for instance, be implemented using a SCSI interface. Advantageously, the storage medium 110 is also included in the system 100. For a disk oriented storage medium 100, data is retrieved in units of a Disk Access Block (DAB), where a DAB is formed by a sequence of consecutive sectors. Typically, DABs which are successively read from a same disk are not stored contiguously on the disk. Usually, DABs which are successively read from the same disk belong to different files (where a file is the collection of blocks belonging to one title) since the disk has to supply DABs for a plurality of data streams in some interleaved manner. Even if DABs which are to be read successively belong to the same file, successive blocks of a file are usually not stored contiguously in one storage unit but are distributed over the storage unit or even over several storage units of the storage medium 110. As a consequence of reading non-contiguous DABs, the disk head needs to be moved in between reading of a DAB and the appropriate starting point of the next DAB has to be awaited. Such a switch takes a considerable time, during which no data can be read. To reduce the switching overhead, the so-called disk sweeping technique is frequently used. In such a scheme, the reader 180 is able to read a number, of for instance eight DABs, from the storage unit 110 in one batch. The DABs of the batch are ordered based on their physical track position. For the read operation, the disk head is moved in only one direction (e.g. from the inner edge to the outer edge or vice versa), only stopping to read the DABs of the batch. In this way, the switching overhead is reduced significantly. Advantageously, a reader 180 is used which accepts a batch of read requests and internally performs the necessary scheduling of the requested read operations in order to perform the most optimal sweep for the specific disk. The reader 180 may also include a caching memory for temporarily storing data read from the disk before supplying the data, potentially in a different sequence than read from disk, via a bus 140 to the remainder of the system 100. It will be appreciated that the role of the reader 180, such as controlling the reading, arranging a sweeping sequence and caching read data, may also be distributed, where each of the storage units has its own controller performing these functions. If so, a main task of the reader 180 is to co-ordinate the operations of the various control units.

Particularly for video, a data stream may be very voluminous. To reduce the volume, typically, compression techniques are used. The compression scheme may result in a fixed rate data stream, for instance using a fixed rate form of MPEG-1 encoding, or a variable rate data stream, for instance using a variable rate form of MPEG-2 encoding. The system according to the invention may be used for fixed rate systems as well as variable rate systems. For variable data rate streams a fixed identical maximum consumption rate of $c^{max}$ data elements per second may be given, which is used for dimensioning the system (e.g. bandwidth of the system and/or size of storage) in order to ensure that the system still operates in a worst case situation (e.g. when all data streams consume data at the maximum data rate). Such a variable rate system is called homogenous. In principle, the system according to the invention can also be used for a heterogeneous variable rate system where the data rate of data stream i is bounded by a stream-specific upperbound $c_i^{max}$. Normally, the data is stored in the storage medium 110 and processed by the system 100 in a compressed form. Only at the user 130 the data stream is decompressed, using a decoder. Particularly for a variable rate system, the system 100 may also be able to support VCR like control functions. A data stream may be in one of a plurality of states like an active and a new/halted state, where an active data stream may supply data to a user (i.e. the user may consume data) and a new or halted data stream may (currently) not supply data to a user (i.e. no sufficient data is present for consumption by a user without running the risk that underflow of the corresponding buffer occurs). Typically, if a user temporarily stops consuming data, the stream stays active. If the user switches stream (e.g. explicitly selects a new title or implicitly is provided with a new stream by, for instance, instructing the system to play in fast forward mode which results in selecting a new stream with the same title being displayed fast), the stream is temporarily halted allowing for new data to be loaded. It will be appreciated that a slow motion function may be implemented by consuming data at a low rate (the stream remains active) or switching to a new stream (the stream is temporarily halted). The system 100 maintains for the data stream a stream status which indicates the current state. The stream status for one or more data streams may be stored in a status memory 190, such as the main memory (RAM) of the server or special registers.

Data is read from the storage medium 100 for a batch of data streams where the data of the batch is supplied as a time multiplexed stream via the bus 140. The storage medium 100 is not capable of simultaneously supplying continuous data streams to all users of the system. Instead, data for a subset of data streams is read and supplied to the remainder of the system 100 at a higher data rate then consumed by the corresponding data streams. The system 100, therefore, comprises buffers 120 for achieving supply of data at the required rate to the users 130. Usually, the buffers 120 are implemented using RAM. The system 100 further comprises communication means 150 for transferring data of the data streams to users. The communication means 150 may be formed by any suitable means, such as a local area network, for supplying the data to users located near the system 100. In practice, a telecommunication or cable network is used for supplying the data over a longer distance.

The system 100 also comprises a control unit 160 for controlling the system 100. A main part of the control unit is formed by the scheduler 170, which determines which DABs should be read by the reader 180 from the storage medium 110 in order to avoid that an underflow or overflow of the buffers 120 occurs. The control unit is typically formed by a processor, such as a RISC-, or CISC-type microprocessor, which is operated under control of a real-time operating system, loaded from a storage medium, such as ROM or a hard disk. The scheduler 170 may be implemented as a software module integrated into the operating system or loaded as an application program. Typically, the scheduler 170 receives status information, such as a filling degree of the buffers, upon which the scheduler 170 bases its decision. For systems which offer VCR-like controls, the scheduler also receives information regarding the status of a stream. In such systems, typically, control information is received from the users 130 via the communication means 150.

Figure 2:
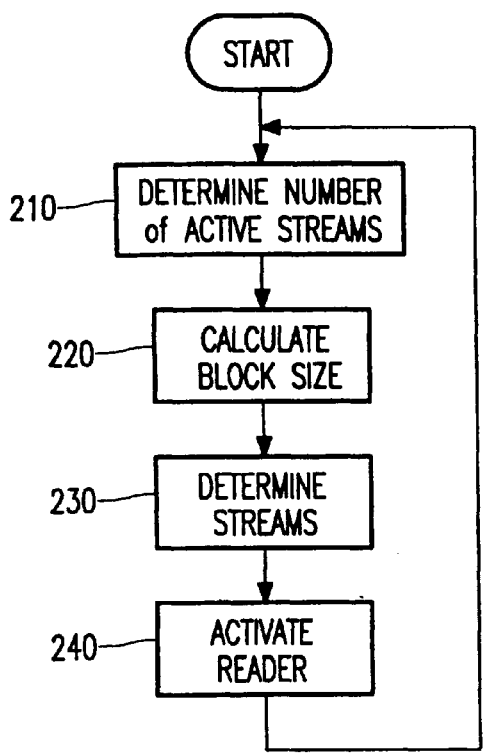
FIG. 2 shows a flow diagram of operations of the scheduler according to the invention.

The scheduler 170 controls reading of blocks from the storage medium 110. The scheduler operates in a cyclical manner. FIG. 2 shows a flow chart of the operation of the scheduler. At the beginning of each cycle, the scheduler 170 in step 210 determines how many data streams are active at that moment. Next in step 220, the scheduler calculates the size of the data block to be read in the following sweeping operation. The size is determined through an expression that, with respect to a number of data streams, is based on an actual number $n^{act}$ of active data streams. The expression itself is specific for the scheduling algorithm on which the system is based. It will be appreciated that in practice the block size is expressed in units of a sector, implying that calculated size is upwardly rounded to an integer number of sectors. In step 230, the scheduler 170 determines a group of data streams for which a block of data needs to be read within this cycle. For variable rate systems, the scheduler 170 may actively check which of the buffers 125 have room for a new block of the calculated size. For a fixed rate scheduling algorithm, the scheduler 170 may determine that a new block needs to be read for all active streams. Next, in step 240 the scheduler 170 causes the reader 180 to read the corresponding blocks (actually, the DABs associated with the blocks) from the storage medium 110. In response to a block read request issued by the scheduler 170, the reader 180 arranges that the corresponding block is read from the storage medium 110. The read block is stored in one of the buffers 125 which corresponds to the data stream for which the block is read. The data is supplied from that buffer to a user. After the reader 180 has substantially read the data blocks, the scheduler 170 starts the next cycle at step 210.

As described earlier, the expression for determining the size of the block is specific for the scheduling algorithm on which the system is based. As an example, the expression for the Triple Buffer Algorithm will be shown, after a description of relevant disk performance aspects.

Data is stored in concentric circles, called tracks, on the disk. Each track consists of an integer number of sectors. Tracks near the outer edge of a disk may be contain more sectors than tracks near the inner edge. For this purpose, modern disks arrange the set of tracks in non-overlapping zones, where the tracks in a zone have the same number of sectors and different zones correspond to different number of sectors. Typically, a disk rotates at a constant angular velocity, so that reading from tracks in a zone near the outer edge results in a higher data transfer rate than reading from tracks in a zone near the inner edge. The time required for accessing data from the disk is mainly determined by: a seek time, i.e. the time needed to move the reading head to the desired track, a rotational latency, i.e. the time that passes before the required data moves under the reading head once the track has been reached, and a read time, i.e. the time needed to actual read the data. The sum of the seek time and the rotational latency is referred to as switch time.

The read time depends on the amount of data to be read and the radial position of the track(s) on which the data is stored. The rotational latency per access takes at most one revolution of the disk. The seek time per access is maximal if the reading head has to be moved from the inner edge to the outer edge of the disk, or vice versa. To avoid that such a maximum seek has to be taken into account for each access, disk accesses are handled in batches, called a sweep. As the head moves from the inner edge to the outer edge, or vice versa, the required data blocks are read in the order in which they are encountered on disk. The total seek time that is required to execute a sweep with n accesses has been shown to be maximal when all n seeks cross an equal number of tracks. For the purpose of the description, it is assumed that the storage medium is characterised by a guaranteed data transfer rate r and a switch time function s(l, m). The switch time function s(l, m) gives the time that is maximally spent on switching when l data blocks have to be retrieved in m sweeps. Since the seek time for a sweep with n accesses is maximal when the stops are evenly apart, the seek time for the retrieval of l data blocks in m sweeps is maximal if the l blocks are evenly distributed over the m sweeps and the seeks within one sweep cross an equal number of tracks. The data transfer rate r gives the minimum guaranteed rate at which data can be read. To avoid that this data rate has to be based on the data rate of the inner tracks of a disk, track pairing may be used where, for instance, a block which is striped over all disks of the array. In such a case, data for the block to be read from a track i of one disk is paired with reading data from a track $tr^{max}-i+1$, $i \leq i \leq tr^{max}$, of another disk, where $tr^{max}$ denotes the maximum number of tracks. In this way r can be given by d times the average rate of a single disk, where d denotes the number of disks in the array.

For simplicity of the expression it is assumed that the consumption rates for all streams are bounded by an identical upper bound c (i.e. the set of streams is homogeneous), which is usually the case in a variable rate consumption system. Persons skilled in the art will be able to derive similar expressions for a heterogeneous system. The conventional Triple Buffering Algorithm works as follows. For each admitted stream a buffer is reserved which is large enough to hold three data blocks of size $b^{max}$. Streams are serviced in sweeps, where a next sweep starts upon completion of the previous sweep. A new stream becomes active (i.e. may start consuming) after the sweep in which a first data block for this stream is fetched is completed. If at the beginning of a sweep, the buffer corresponding to a stream has room for a new block, the stream is serviced in this sweep by fetching a data block of size $b^{max}$ from the storage medium. It has been proven that the Triple Buffering Algorithm is safe (i.e. it is guaranteed that buffers of active streams never under- or overflow) if and only if the size of the data block is large enough to survive a worst-case sweep. The worst-case sweep occurs if in one sweep for the maximum number of $n^{max}$ streams allowed to be active in the system a block needs to be read. The duration of such a sweep is: $n^{max} \cdot b^{max}/r + s(n^{max}, 1)$. The buffer must minimally be able to supply data for this period at the maximum consumption rate c, giving:

$$b^{max}/c \geq n^{max} \cdot b^{max}/r + s(n^{max}, 1) \quad (1).$$

Therefore, the buffer requirements are minimal if the block size for each stream is given by:

$$b^{max} = c \cdot n^{max} \cdot b^{max}/r + c \cdot s(n^{max}, 1), \quad (2)$$

which gives:

$$b^{max}=r.s(n^{max},1).c/(r-n^{max}.c) \quad (3).$$

The response time is given by:
(a) the time that passes until the current sweep has ended, and
(b) the duration of the sweep in which the block for the new stream is fetched. As such, the worst-case response time is twice the duration of a worst-case sweep, which for a minimum size buffer corresponds to: $2\ b^{max}/c$. It will be appreciated that the average case response time will be better, since usually the actual number of active streams for which a data block must be fetched in a given sweep is much lower than the maximum allowed number ($n^{max}$), and the disk performs better than the worst case.

According to the invention, the size of the data block depends, with respect to the number of data streams, on the actual number of active data streams $n^{act}$ instead of on the maximum allowed number $n^{max}$. Based on expression (3), this gives that the size of the data block $b(n^{act})$ as a function of the number of active data streams is given by:

$$b(n^{act})=r.s(n^{act},1).c/(r-n^{act}.c) \quad (4).$$

It can be proven that for all integer values $n^{act} \leq n^{max}$ it holds that $b(n^{act}) \leq b^{max}$. With respect to the response times, it can be noted that in the system according to the invention component (a) (duration of the current sweep) will be smaller than for the conventional approach. In general, also component (b) (duration of the sweep in which the block for the new stream is fetched) will be smaller. However, without special further measures it may not be guaranteed that a new data stream can be serviced in the next sweep. If all already active streams require a block, no room may be left in the next sweep. As such in a system where all active streams continuously consume at the maximum rate, the response time may become long. If the performance of the disk within a "fully loaded" sweep can be predicted to be sufficiently better than the worst-case assumption so to be able to fetch one more block in the sweep, a new stream can nevertheless be serviced in such a sweep. At the end of that sweep the new stream becomes active (resulting in an increase of the number of active streams) and for all successive sweeps can be serviced since then the block size will have been adapted to the new situation. Similarly, if the new stream could not guaranteed to be serviced in a sweep since all active streams required a block, at the end of that sweep it may prove that within the maximum allowed duration of a sweep still one or more additional blocks can be read. If so, the new stream can be serviced. It should be noted that in practice for variable rate systems it is highly likely that not all streams require a block within a sweep. As such one or more new streams can be serviced immediately in the next sweep.

In a further embodiment according to the invention the system is improved to guarantee that a predetermined maximum number of $n^{delta}$ new data streams can additionally be serviced in the next sweep (assuming that the maximum number of streams $n^{max}$ has not yet been reached). To this end, the scheduler 170 determines in step 220 the size of the data block such that potential underflow of the buffers is avoided for $n^{act}+n^{delta}$ active data streams consuming at a maximum consumption rate $c^{max}$. Like before, this technique can be used for a homogeneous as well as a heterogeneous system. The number $n^{delta}$ may be a constant (e.g. a fixed percentage of $n^{max}$) or variably determined (e.g. a percentage of the actual number of users $n^{act}$). The scheduler can simply perform this optimisation by in step 210 replacing the determined number of actual user $n^{act}$ by $n^{act}+n^{delta}$. In this way the size of the data block to be fetched depends, with respect to the number of data streams, exclusively on $n^{act}+n^{delta}$. By using for $n^{delta}$ a value which is substantially smaller than $n^{max}-n^{act}$, in practical situations on average $n^{act}+n^{delta}$ will be substantially smaller than $n^{max}$. As such, the block size will be substantially smaller, resulting in substantially shorter sweeps. Consequently, both components (a) and (b) of the response time will be smaller, where it can be guaranteed that at least $n^{delta}$ data streams can be serviced in the first sweep following the request to be included. As such the total response time for those streams will be the combination of (a) and (b), without any further delay for having to wait for being serviced.

For the Triple Buffering Algorithm, the following calculation of the buffer size can be given. It is assumed that the number of streams to be serviced in sweep x is given by $n^{ser}(x) \leq n^{max}$, where $n^{ser}$ is formed by the already active streams $n^{act}$ and new streams which have been accepted in the system during a previous sweep and for which in sweep x the first block is going to be fetched. Consequently, at the start of the next sweep x+1 the number of active streams $n^{act}$ will be identical to $n^{ser}$. In this next sweep x+1 $n^{delta}$ data streams may enter the system (i.e. for these streams a new block will be fetched and at the end of that sweep the streams will become active). This can be expressed by:

$$n^{ser}(x+1) \leq n^{ser}(x)+n^{delta} \quad (5)$$

The size $b(n^{ser}(x))$ of the block is the size which is exactly large enough to survive a worst-case sweep x in which for $n^{ser}(x)$ streams a block has to be retrieved, where the block is large enough to survive a worst-case sweep x+1. Since at the beginning of sweep x+1 there are at most $n^{ser}(x)+n^{delta}$ active streams, a worst-case sweep x consists of the retrieval of $n^{ser}(x)$ blocks of size $b(n^{ser}(x)+n^{delta})$. Using equation (2), this gives the following recurrence relation:

$$b(n^{ser}(x))=c.s(n^{ser}(x),1)+c.n^{ser}(x).b(n^{ser}(x)+n^{delta})/r. \quad (6)$$

A solution to this relation is given by:

$$b(n^{ser}(x)) = \sum_{i=0}^{k-1}\left(\frac{c^{i+1}}{r^i}s(n^{ser}(x)+i\cdot n^{delta},1)\right)+\frac{c^k}{r^k}b^{max}\prod_{j=0}^{k-1}(n^{ser}(x)+j\cdot n^{delta}) \quad (7)$$

for $n^{ser}(x) \geq 0$ and k is given by:

$$k=\max\{n^{max}-n^{ser}(x)+n^{delta}-1,0\}\ \text{div}\ n^{delta} \quad (8).$$

Figures 3A, 3B:
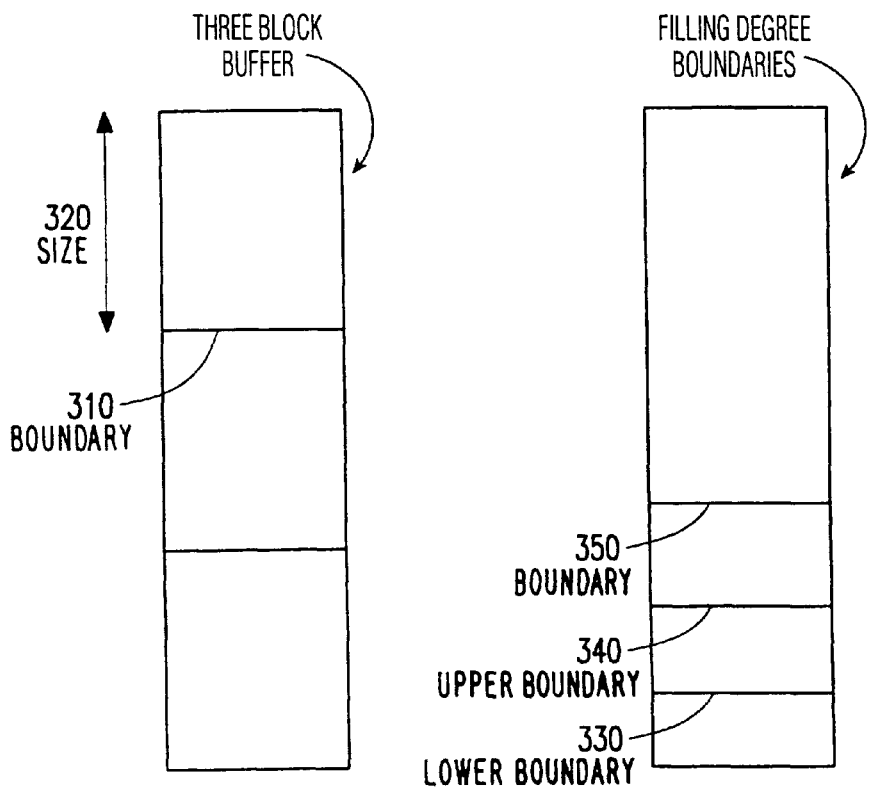
FIGS. 3a–3b shows block boundaries comparing the Triple Buffering Algorithm to an embodiment according to the invention.

The conventional Triple Buffering Algorithm is then modified as follows. Like before, for each stream a buffer is reserved which is large enough to store three data blocks of the maximum size $b^{max}$. If at a beginning of sweep x, the number of active streams is $n^{act}$, then a stream will be serviced if the corresponding buffer holds less then $b(n^{act}(x))+b(n^{act}(x)+n^{delta})$ data elements in his buffer and a block of size $b(n^{act}(x)+n^{delta})$ will be fetched. This is illustrated in FIG. 3, where FIG. 3a shows the three block buffer used for both the conventional Triple Buffering Algorithm and the algorithm modified according to the invention. By interpreting FIG. 3a as being indicative for a filling degree of the buffer, it the filling degree falls below the boundary 310, a new block is going to be read in the next cycle, with a size corresponding to the indicated size 320, being $b^{max}$. FIG. 3b illustrates filling degree boundaries which are used in the modified Triple Buffering Algorithm. The lower boundary 330 corresponds to the buffer storing $b(n^{act}x))$ data elements and the upper boundary 340 to the buffer storing $b(n^{act}(x))+b(n^{act}(x)+n^{delta})$ data elements. As soon as the buffer filling falls below the upper boundary 320, a block will be fetched of size $b(n^{act}(x)+n^{delta})$, potentially bringing the filling degree up to a maximum filling, at that moment and assuming no consumption during the sweep, as indicated by boundary 350. It will be appreciated that as long as $n^{act}$ is substantially smaller than $n^{max}$, the boundaries of FIG. 3b are substantially lower than the corresponding boundaries in FIG. 3a.

The Triple Buffering Algorithm modified as described above has been simulated. For the simulations it has been assumed that all active streams consume data at an identical maximum rate of 1.5 Mbits/sec. The disk parameters are based on Seagate Elite 9 disk, which has a transfer rate varying from 44 Mbits/sec for the inner tracks to 65 Mbits/sec for the outer tracks, and has a worst-case rotational latency of 11.17 msec. For each simulation the maximum total number of streams $n^{max}$ allowed to be active in the system and the actual number of streams $n^{act}$ is fixed. Note that for one disk and a consumption rate of 1.5 Mbits/sec, the maximum number of streams is limited by $n^{max} \leq 29$. Response times are measured by repeatedly one of the streams generating a request for other data (e.g. switching of title). The stream which issues the request is randomly chosen. The time between two successive requests is chosen uniformly within an interval of 13 to 28 seconds. This interval has been chosen large enough to ensure that successive requests do not interfere. Each simulation is based on 50,000 requests. The following three tables shows values of $b(n^{act})$ as a percentage of $b^{max}$ for differing values of $n^{new}$.

| | $n^{max}$ | | | |
|---|---|---|---|---|
| $n^{act}$ | 10 | 15 | 20 | 25 |
| | $n^{new} = 1$ | | | |
| 5 | 45.8 | 23.5 | 11.7 | 4.4 |
| 10 | 100.0 | 55.7 | 27.7 | 10.4 |
| 15 | — | 100.0 | 59.2 | 21.6 |
| 20 | — | — | 100.0 | 59.2 |
| 25 | — | — | — | 100.0 |

-continued

| | $n^{max}$ | | | |
|---|---|---|---|---|
| $n^{act}$ | 10 | 15 | 20 | 25 |
| | $n^{new} = 3$ | | | |
| 5 | 50.2 | 26.6 | 13.5 | 5.3 |
| 10 | 100.0 | 63.4 | 35.8 | 16.1 |
| 15 | — | 100.0 | 70.4 | 40.2 |
| 20 | — | — | 100.0 | 74.8 |
| 25 | — | — | — | 100.0 |
| | $n^{new} = 15$ | | | |
| 5 | 53.4 | 35.6 | 26.3 | 17.1 |
| 10 | 100.0 | 67.8 | 50.9 | 40.4 |
| 15 | — | 100.0 | 75.4 | 60.3 |
| 20 | — | — | 100.0 | 80.2 |
| 25 | — | — | — | 100.0 |

As an example, for $n^{act}=10$, $n^{max}=25$, and $n^{new}=3$, the block size is only 16.1% of the block size in a conventional Triple Buffer system (or, phrased differently, in the system modified according to the invention, when the system is fully loaded with $n^{max}$ active streams).

The next table shows a comparison of the average response times of the conventional Triple Buffering Algorithm compared to the algorithm modified according to the invention, which is named Triple Buffering Algorithmn with Dynamic Block Size Adjustment. The average response times are shown as the top figures in the entries of the table, whereas the 99% quantiles are shown as the lower figures in the entries. The table is given for $n^{new}=1$.

| | Triple Buffering Algorithm | | | | | | Triple Buffering Algorithm with Dynamic Block Size Ajustment. | | | | |
|---|---|---|---|---|---|---|---|---|---|---|---|
| | | $n^{max}$ | | | | | | $n^{max}$ | | | |
| $n^{act}$ | 5 | 10 | 15 | 20 | 25 | $n^{act}$ | 5 | 10 | 15 | 20 | 25 |
| 5 | 44.5 | 34.9 | 39.9 | 55.4 | 110.2 | 5 | 44.7 | 39.8 | 39.9 | 39.9 | 39.9 |
|   | 97.3 | 86.1 | 97.5 | 131.3 | 243.8 |   | 97.8 | 95.3 | 95.8 | 95.7 | 96.4 |
| 10 | — | 65.2 | 54.5 | 68.1 | 126.9 | 10 | — | 65.1 | 60.4 | 59.9 | 59.7 |
|   |   | 146.9 | 141.2 | 181.0 | 326.7 |   |   | 147.5 | 150.9 | 150.1 | 150.0 |
| 15 | — | — | 89.9 | 89.9 | 154.0 | 15 | — | — | 89.6 | 92.4 | 93.3 |
|   |   |   | 213.8 | 242.8 | 424.3 |   |   |   | 213.4 | 253.5 | 256.5 |
| 20 | — | — | — | 134.1 | 199.8 | 20 | — | — | — | 134.3 | 179.5 |
|   |   |   |   | 335.7 | 571.5 |   |   |   |   | 336.1 | 543.2 |
| 25 | — | — | — | — | 280.6 | 25 | — | — | — | — | 280.0 |
|   |   |   |   |   | 743.9 |   |   |   |   |   | 746.4 |

Above tables illustrates that the average response times in the system according to the invention can be significantly lower. For instance, for $n^{new}=1$, $n^{act}=10$ and $n^{max}=25$ the average response time is reduced from 126.9 msec. to 59.7 msec.

Figure 4:
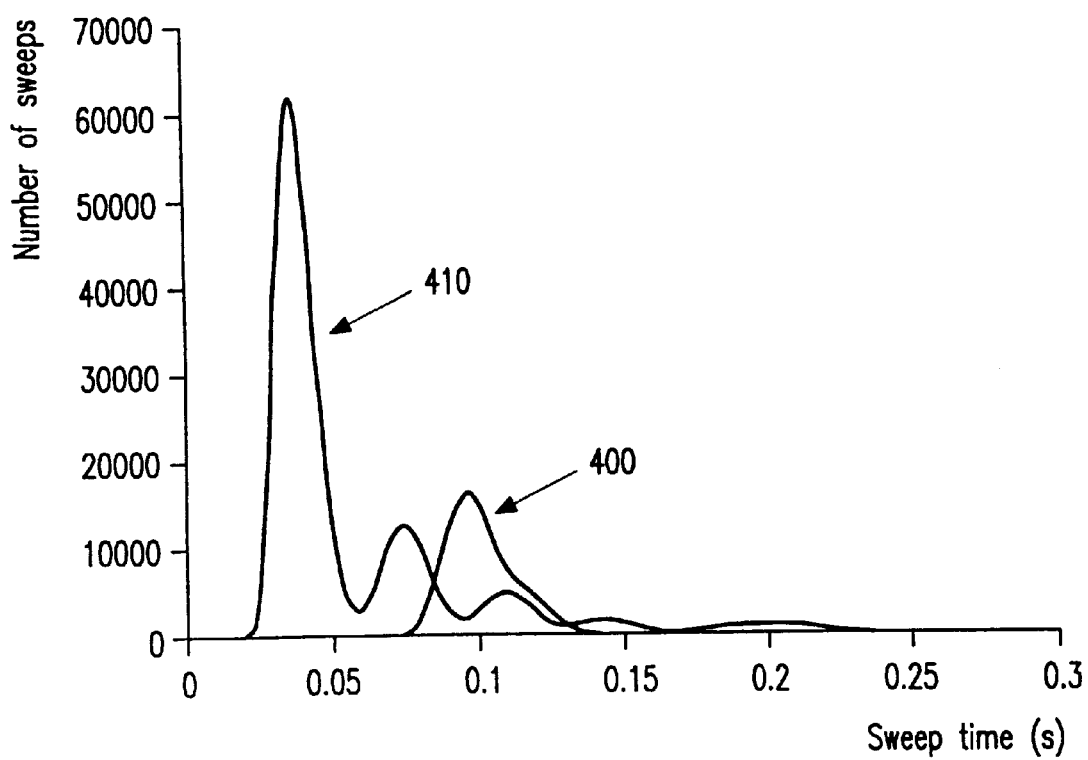
FIG. 4 shows a frequency diagram of simulated sweep times comparing the Triple Buffering Algorithm to an embodiment according to the invention.

FIG. 4 illustrates a frequency diagram of the sweep times observed for the Triple Buffering Algorithm indicated by 400 and the Triple Buffering Algorithm with Dynamic Block Size Adjustment indicated by 410 for $n^{new}=1$, $n^{act}=15$ and $n^{max}=25$. The diagram illustrates that the sweep times for the modified algorithm on average are significantly shorter, due to fetching smaller blocks. It should be noticed, however, that fetching too small blocks can cause too much disk overhead causing response times to increase again. This can, for instance, be noticed in the response time table for $n^{new}=1$, $n^{act}=5$ and $n^{max}=10$, where the response time actually increases from 34.9 msec. to 39.8 msec.

In the embodiments described above the size of the block to be read depends exclusively on the active number of data streams $n^{act}$ (where required complemented by the number of new data streams $n^{new}$) with respect to the number of data streams. Since in the system memory is anyhow available for fetching and storing full size blocks, advantageously, for small blocks not a block of the smallest possible size, being $b(n^{act})$ or $b(n^{act}+n^{new})$, is fetched, but instead a size is chosen in between $b(n^{act})$(or $b(n^{act+ndelta})$) and $b^{max}$. This can be formally expressed by the block size $b(n^{act},y)$ being:

$$b(n^{act},y)=b(n^{act})+y.(b^{max}-b(n^{act})), \text{ where } 0 \leq y < 1. \quad (8)$$

As can also be seen in the table, in practice only a moderate increase of the block size is required to compensate for the less good performance. Therefore, preferably a block size is chosen which is substantially closer to $b(n^{act})$ then to $b^{max}$. For certain small block sizes it may be required to increase the blocks size with up to 20 or 30% of $b^{max}$. This can be formally expressed by $0 \leq y \leq 0.3$. Persons skilled in the art will be able to define an optimal size for a specific algorithm. The size may, for instance, be determined using simulations as described above.

In an alternative embodiment of the system according to the invention, no restrictions are posed on the number of new streams which may enter the system, besides the obvious restriction that the total number of streams formed by the currently active streams and the newly to be admitted streams may not exceed the total number of streams allowed in the system ($0 \leq n^{new} \leq n^{max}-n^{act}$). At the same time it is guaranteed that a block can be read for each new streams in the first sweep that follows. This is achieved by reading for a new data stream in the next sweep the amount of data required to be read in a fully loaded system, i.e. with $n^{max}$ active data streams. As an example, for an algorithm based on the Triple Buffering Algorithm, a full size block $b^{max}$ is read. As before, $b^{max}$ corresponds substantially to $t^{max}*c^{max}$, where $t^{max}$ is a maximum duration for reading a data block with $b^{max}$ data elements for each of at maximum $n^{max}$ data streams in one sweep. The stream is only activated after the sweep in which this block is read has completed. In the same sweep also data is fetched for all streams which were already active streams. For these streams once already the large amount of data has been read. It is, therefore, sufficient that a complementary amount of data is read which is sufficient to survive a worst-case next sweep. In the next sweep, the current number of active streams $n^{act}$ is complemented by the number of new streams $n^{new}$ for which a first amount of data is read in the current sweep, making the total number of active streams for the next sweep $n^{act}+n^{new}$. All of those streams may require data. Therefore, in the current sweep in addition to fetching a full amount of data for up to $n^{new}$ new streams, for the active streams which require data a data block is read of a size which is sufficient to avoid underflow of the buffers for active data streams consuming at the maximum consumption rate. As before, the size of the block can be determined via an expression, which with respect to the number of data streams, depends on $n^{act}+n^{new}$. Like before, the expression may exclusively be based on $n^{act}+n^{new}$ with respect to the number of data streams, or alternatively, the size of the block may be increased for too small blocks by also basing the expression on $n^{max}$ (or $b^{max}$ which is related to $n^{max}$). In this way the algorithm ensures that if a data block is fetched in a given sweep for an already active data stream, at the end of this sweep again a maximum size data block is in the buffer.

It will be appreciated that, although expressions have been shown with reference to the Triple Buffering Algorithm, persons skilled in the art will be able to formulate in a similar manner expressions for other scheduling algorithms.

What is claimed is:

1. A system for retrieving blocks of data from a storage medium and supplying the data to users in the form of a plurality of at maximum $n^{max}$ data streams; wherein each data stream is in one of a plurality of states including at least a new and an active state, where a data stream upon creation is in the new state in which no sufficient data is present for consumption by a user and where for an active data stream a user may consume data; said system comprising:

for each data stream an associated buffer for storing data; and a reader for reading in one sweep from the storage medium for each data stream of a selected group of data streams a predetermined size data block and for storing the read data blocks in the buffers associated with the data streams;

a scheduler for repeatedly selecting the group of data streams for which a data block of a predetermined size needs to be read during a next sweeping operation of the reader; the group comprising active data streams whose associated buffers have room for storing the data block; and causing the reader to read data for the selected group; characterised in that: the scheduler is operative to minimize access time by variably determining the size of the data block for each next sweeping operation through an expression that, with respect to a number of data streams, is substantially based on an actual number $n^{act}$ of active data streams.

2. A system as claimed in claim 1, wherein the scheduler is operative to, before causing the reader to perform a next sweeping operation, create a requested number of $n^{new}$ new data streams, where $n^{new}$ is bounded by a predetermined maximum number of $n^{delta}$ new data streams, where $n^{delta}$ is substantially smaller than $n^{max}-n^{act}$, and wherein the scheduler determines the size of the data block such that potential underflow of the buffers is avoided for $n^{act}+n^{delta}$ active data streams consuming at a maximum consumption rate $c^{max}$ by the dependency of the expression on $n^{act}$ being based on a linear term $n^{act}+n^{delta}$.

3. A system as claimed in claim 1, wherein the scheduler is operative to for each next sweeping operation:

create a requested number of $n^{new}$ new data streams, where $0 \leq n^{new} \leq n^{max}-n^{act}$; and arrange that the buffers associated with the new data streams comprise a sufficient amount of data to avoid underflow of the buffers for $n^{max}$ active data streams consuming data at a maximum consumption rate $c^{max}$, by adding the new data streams to the selected group of active data streams and causing the reader to read $b^{max}$ data elements for the new data streams of the group, where $b^{max}$ substantially corresponds to $t^{max}*c^{max}$, where $t^{max}$ is a maximum duration for reading a data block with $b^{max}$ data elements for each of at maximum $n^{max}$ data streams in one sweep; and determine the size of the data block to be read for the active data streams of the selected group such that potential underflow of the buffers is avoided for $n^{act}+n^{new}$ active data streams consuming at the maximum consumption rate by the dependency of the expression on $n^{act}$ being based on a linear term $n^{act}+n^{new}$.

* * * * *

UNITED STATES PATENT AND TRADEMARK OFFICE
CERTIFICATE OF CORRECTION

| | | |
|---|---|---|
| PATENT NO. | : 6,205,525 B1 | |
| APPLICATION NO. | : 09/106712 | |
| DATED | : March 20, 2001 | |
| INVENTOR(S) | : Johannes H. M. Korst | |

It is certified that error appears in the above-identified patent and that said Letters Patent is hereby corrected as shown below:

On the Title Page, item 54 & Col. 1 line 1, "SYSTEM FOR SUPPLYING DATA STEAMS" should read: --SYSTEM FOR SUPPLYING DATA STREAMS--

Signed and Sealed this
Twenty-ninth Day of May, 2012

David J. Kappos
*Director of the United States Patent and Trademark Office*